US009470163B2

(12) United States Patent
Matsushima (10) Patent No.: US 9,470,163 B2
(45) Date of Patent: Oct. 18, 2016

(54) CONTROL APPARATUS AND METHOD FOR INTERNAL COMBUSTION ENGINE

(71) Applicant: Mitsubishi Electric Corporation, Chiyoda-ku, Tokyo (JP)

(72) Inventor: Yuhei Matsushima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 14/341,948

(22) Filed: Jul. 28, 2014

(65) Prior Publication Data

US 2015/0136070 A1    May 21, 2015

(30) Foreign Application Priority Data

Nov. 18, 2013 (JP) ................................ 2013-237681

(51) Int. Cl.

| F02D 41/00 | (2006.01) |
|---|---|
| F02P 5/04 | (2006.01) |
| F02D 41/30 | (2006.01) |
| F02D 41/14 | (2006.01) |
| F02P 5/15 | (2006.01) |
| F02D 13/02 | (2006.01) |
| F02D 37/02 | (2006.01) |
| F02D 35/02 | (2006.01) |

(52) U.S. Cl.
CPC ....... *F02D 41/0057* (2013.01); *F02D 13/0265* (2013.01); *F02D 35/025* (2013.01); *F02D 37/02* (2013.01); *F02D 41/006* (2013.01); *F02D 41/1498* (2013.01); *F02D 41/3011* (2013.01); *F02D 41/3035* (2013.01); *F02D 41/3064* (2013.01); *F02P 5/045* (2013.01); *F02P 5/1504* (2013.01); *F02P 5/1516* (2013.01); *F02D 35/023* (2013.01); *F02D 35/027* (2013.01); *F02D 2041/001* (2013.01); *Y02T 10/128* (2013.01); *Y02T 10/18* (2013.01); *Y02T 10/46* (2013.01); *Y02T 10/47* (2013.01)

(58) Field of Classification Search
CPC .......... F02D 41/3011; F02D 41/3035; F02D 41/3064
See application file for complete search history.

(56) References Cited

U.S. PATENT DOCUMENTS 8,655,572 B2 * 2/2014 Iwai .................... F02D 41/0057
123/295

(Continued)

FOREIGN PATENT DOCUMENTS

| JP | 11-287146 A | 10/1999 |
|---|---|---|
| JP | 2007-247479 A | 9/2007 |
| JP | 4438792 B2 | 3/2010 |

OTHER PUBLICATIONS

Communication dated Nov. 18, 2014, issued by the Japanese Patent Office in counterpart Japanese application No. 2013-237681.

*Primary Examiner* — Erick Solis
(74) *Attorney, Agent, or Firm* — Sughrue Mion, PLLC; Richard C. Turner (57) ABSTRACT

A control apparatus for an internal combustion engine is capable of switching a combustion mode between a spark ignition combustion mode for combusting a mixture formed in a combustion chamber with spark ignition and a compression ignition combustion mode for combusting the mixture with compression ignition. When the combustion mode is switched from the spark ignition combustion mode to the compression ignition combustion mode, in an internal EGR control for keeping a part of a burnt gas generated by the combustion remaining as an internal EGR in the combustion chamber, an internal EGR amount of the internal EGR is increased, an ignition timing is advanced, and a fuel injection amount is decreased so that an oxygen density contained in the internal EGR used to form the mixture increases.

13 Claims, 5 Drawing Sheets

(56) References Cited

U.S. PATENT DOCUMENTS

| | | | |
|---|---|---|---|
| 2004/0173166 A1* | 9/2004 | Kobayashi | F02B 1/04 123/21 |
| 2008/0147300 A1* | 6/2008 | Kakuya | F02D 13/0265 701/103 |
| 2008/0281497 A1* | 11/2008 | Kumano | F02M 26/01 701/102 |
| 2009/0095250 A1* | 4/2009 | Kuzuyama | F02B 1/12 123/27 R |

* cited by examiner

CONTROL APPARATUS AND METHOD FOR INTERNAL COMBUSTION ENGINE

BACKGROUND OF THE INVENTION

1. Field of the Invention

The present invention relates to a control apparatus and method for an internal combustion engine capable of switching a combustion mode between a spark ignition combustion mode and a compression ignition combustion mode.

2. Description of the Related Art

Hitherto, as a combustion method capable of simultaneously attaining improvements of fuel efficiency and an exhaust gas performance in an internal combustion engine (hereinafter referred to as engine), there is known a combustion method (hereinafter referred to as HCCI combustion mode) for igniting a uniform mixture by itself by compressing the mixture with a piston.

As compared with a combustion method (hereinafter referred to as SI combustion mode) involving flame propagation combustion for igniting a mixture with spark ignition of a spark plug, the HCCI combustion mode can improve thermal efficiency with a high compression ratio, can reduce a cooling loss with rapid combustion, and can also reduce a pumping loss, thereby reducing a fuel consumption amount, and can restrain nitrogen oxides (hereinafter referred to as NOx) from being generated with low temperature combustion of a uniform mixture high in the air fuel ratio or the exhaust gas recirculation (EGR) ratio.

In the HCCI combustion mode, the HCCI combustion is realized by keeping a part of a burnt gas generated by the previous combustion cycle remaining (hereinafter referred to as internal EGR), thereby increasing a mixture temperature. However, when the engine is in an operation area on a relatively low load and low revolution side, an increase in temperature of the mixture with the internal EGR is insufficient, and thus the HCCI combustion cannot be realized. Therefore, and the combustion mode needs to be switched to realize the SI combustion in this operation area.

As a technology for switching the combustion mode, Japanese Patent No. 4438792 discloses a technology for switching the combustion mode through mixed combustion of increasing the internal EGR, and increasing the pressure and temperature of a remaining mixture by a combustion pressure of flame propagation combustion by spark ignition, resulting in compression ignition.

However, in the combustion mode switching method disclosed in Japanese Patent No. 4438792, inactive gasses included in the mixture also increase as a result of the increase in the internal EGR, and hence the flame propagation combustion by the spark ignition hardly occurs, resulting in a combustion fluctuation and a misfire. Therefore, when the internal EGR more than a predetermined amount is carried out, stable mixed combustion cannot be realized due to an increase in the combustion fluctuation and the misfire, resulting in such a problem that the combustion mode cannot be switched.

Moreover, as the internal EGR increases, a combustion period extends, and hence the ignition timing needs to be advanced for optimal thermal efficiency. In this case, as the ignition timing is separated from the compression top dead center (hereinafter referred to as compression TDC) more, the pressure and temperature of the mixture at the ignition timing decrease. Further, the combustion temperature decreases as the internal EGR increases, and hence when the ignition timing is advanced as described above, the remaining mixture does not reach a pressure and a temperature for the compression ignition in the flame propagation combustion by the spark ignition, resulting in such a problem that the combustion mode cannot be switched.

SUMMARY OF THE INVENTION

The present invention has been made to solve the above-mentioned problems, and therefore has an object to provide a control apparatus and method for an internal combustion engine capable of smoothly switching a combustion mode between an SI combustion mode and an HCCI combustion mode.

According to one embodiment of the present invention, there is provided a control apparatus for an internal combustion engine, which is capable of switching a combustion mode between a spark ignition combustion mode for combusting a mixture formed in a combustion chamber with spark ignition and a compression ignition combustion mode for combusting the mixture with compression ignition, the control apparatus including: an ignition timing control part for controlling a timing for igniting the mixture with a spark; a fuel injection amount control part for controlling a fuel injection amount supplied to the combustion chamber; an internal EGR control part for keeping a part of a burnt gas generated by the combustion remaining as an internal EGR in the combustion chamber; and a combustion mode switching control part for switching the combustion mode between the spark ignition combustion mode and the compression ignition combustion mode, in which, when the combustion mode switching control part carries out switching from the spark ignition combustion mode to the compression ignition combustion mode, the control apparatus is configured to increase an internal EGR amount of the internal EGR; advance the ignition timing; and to decrease the fuel injection amount so that an oxygen density contained in the internal EGR used to form the mixture increases. According to one embodiment of the present invention, there is also provided a control method for an internal combustion engine.

According to one embodiment of the present invention, it is possible to provide the control apparatus and method for an internal combustion engine capable of smoothly switching the combustion mode between the SI combustion mode and the HCCI combustion mode.

DETAILED DESCRIPTION OF THE PREFERRED EMBODIMENT

A description is now given of a control apparatus and method for an internal combustion engine according to an embodiment of the present invention referring to the drawings. Throughout the embodiment, the same or corresponding components are denoted by the same reference symbols, and a redundant description thereof is omitted.

First Embodiment

Figure 2:
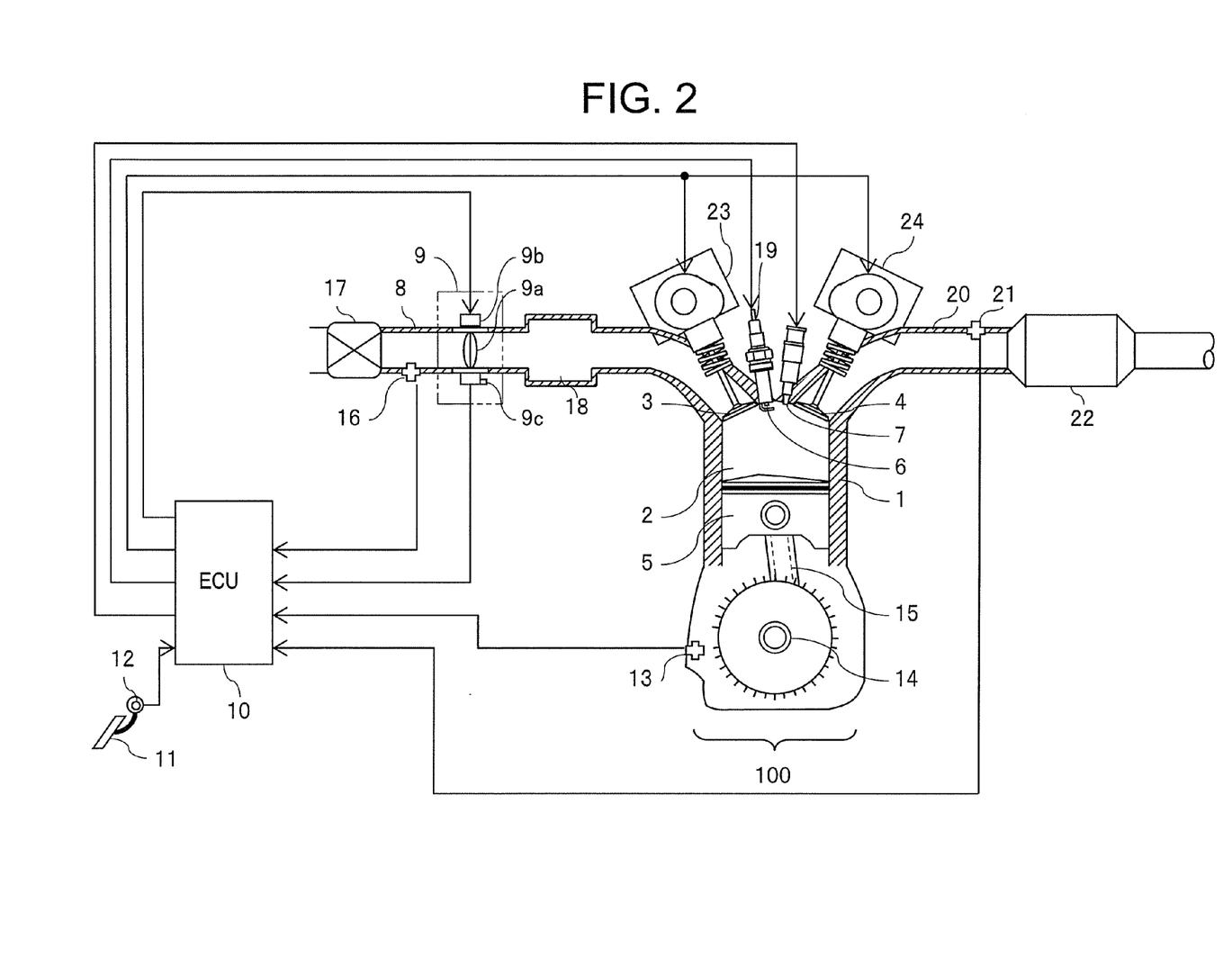
FIG. 2 is an overall configuration diagram of an engine system capable of switching a combustion mode between an SI combustion mode and an HCCI combustion mode including the control apparatus for an internal combustion engine according to the embodiment of the present invention.

FIG. 2 is an overall configuration diagram of an engine system capable of switching a combustion mode between an SI combustion mode and an HCCI combustion mode including the control apparatus for an internal combustion engine according to an embodiment of the present invention. In FIG. 2, in a combustion chamber 2 of a cylinder 1 of an engine 100, an intake valve 3, an exhaust value 4, and a piston 5 are provided, and further, an ignition plug 6 and an injector 7 are provided so as to face the inside of the combustion chamber 2.

The intake valve 3 and the exhaust valve 4 are respectively driven by a variable intake valve train 23 and a variable exhaust valve train 24, and the variable intake valve train 23 and the variable exhaust valve train 24 respectively change valve characteristics such as lift amounts and working angles of the intake valve 3 and the exhaust valve 4.

The piston 5 is connected to a crankshaft 14 via a connecting rod 15, and a crank angle sensor 13 is provided in order to detect a rotation angle (crank angle) of the crankshaft 14.

Moreover, an electronic control throttle 9 provided in an intake passage 8 adjusts an intake air amount supplied to the combustion chamber 2. The electronic control throttle 9 includes a throttle valve 9a, a motor 9b for driving the throttle valve 9a, and a throttle opening degree sensor 9c for detecting an opening degree of the throttle valve 9a.

An engine control unit (hereinafter referred to as ECU) 10 serving as an engine control part acquires an output signal of an accelerator position sensor 12 for detecting an operation amount of an accelerator pedal 11, transmits a control signal to the motor 9b, and controls the throttle valve 9a so as to attain an appropriate opening degree based on a throttle valve opening degree signal from the throttle opening degree sensor 9c.

Moreover, the ECU 10 acquires output signals from the accelerator position sensor 12, the crank angle sensor 13, an airflow sensor 16, and an air fuel ratio sensor 21 as well as various sensors (not shown), thereby determining an ignition timing, a fuel injection amount, and the like. Then, based on the determined values, the ECU 10 drives the injector 7 to inject and supply a fuel into the combustion chamber 2, and drives an ignition coil 19 connected to the ignition plug 6, thereby discharging sparks in a plug gap of the ignition plug 6.

After a flow amount of intake air from which dust and dirt are removed by an air cleaner 17 is measured by the airflow sensor 16, the intake air passes through the electronic control throttle 9, is led to a surge tank 18, further passes from the surge tank 18 through the intake valve 3, and is introduced into the combustion chamber 2. The mixture is formed by mixing the intake air introduced into the combustion chamber 2 and the fuel injected from the injector 7. In the SI combustion mode, the mixture is ignited by the spark discharge of the ignition plug 6, and combusted by the flame propagation. In the HCCI combustion mode, the mixture is compressed by the upward movement of the piston 5, and is ignited almost simultaneously in the entire combustion chamber.

The combustion pressure of the mixture is transferred to the piston 5, and reciprocally moves the piston 5. The reciprocating motion of the piston 5 is transferred via the connecting rod 15 to the crankshaft 14, is converted into a rotational motion at the crankshaft 14, and is extracted as an output of the engine 100. The mixture after the combustion becomes an exhaust gas, passes through the exhaust valve 4, and is exhausted to an exhaust passage 20. The air fuel ratio sensor 21 for detecting the air fuel ratio of the exhaust gas is provided at a collection part of the exhaust passage 20. Moreover, a three-way catalyst 22 for purifying harmful components in the exhaust gas is provided on a downstream side of the collection part of the exhaust passage 20.

Figure 3:
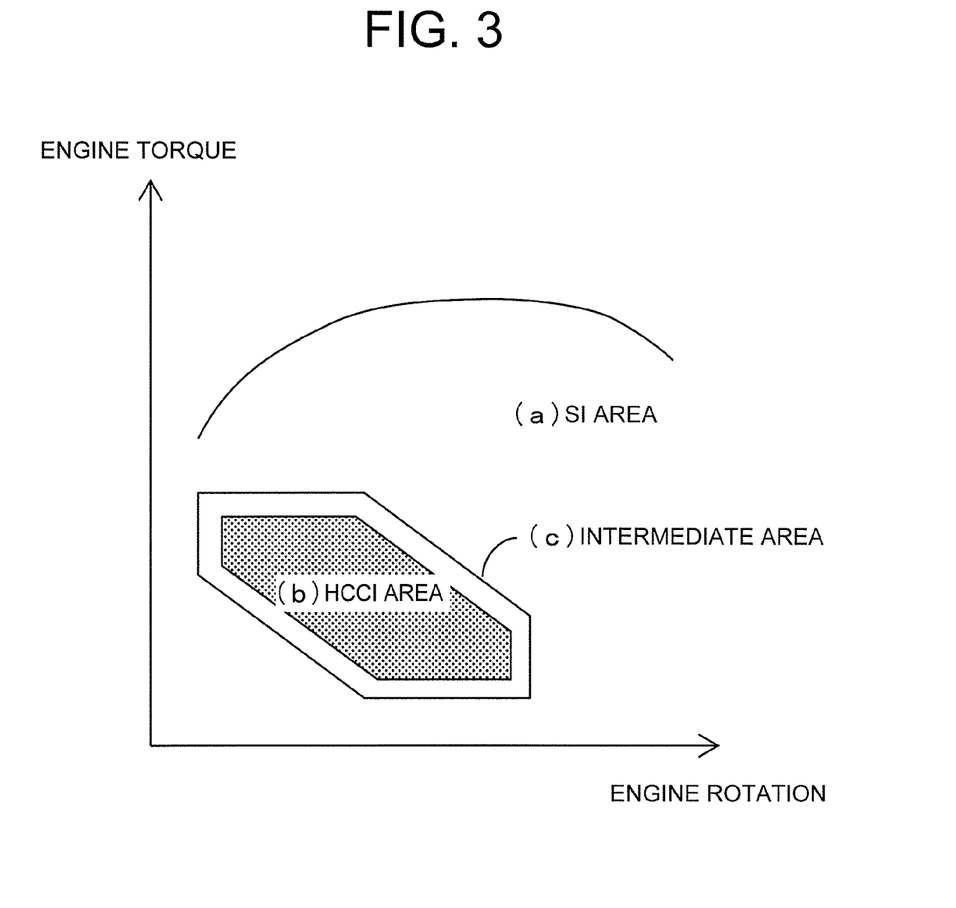
FIG. 3 is an operation area map showing operation areas of the SI combustion mode, the HCCI combustion mode, and an intermediate combustion mode according to the embodiment of the present invention.
Figure 4A:
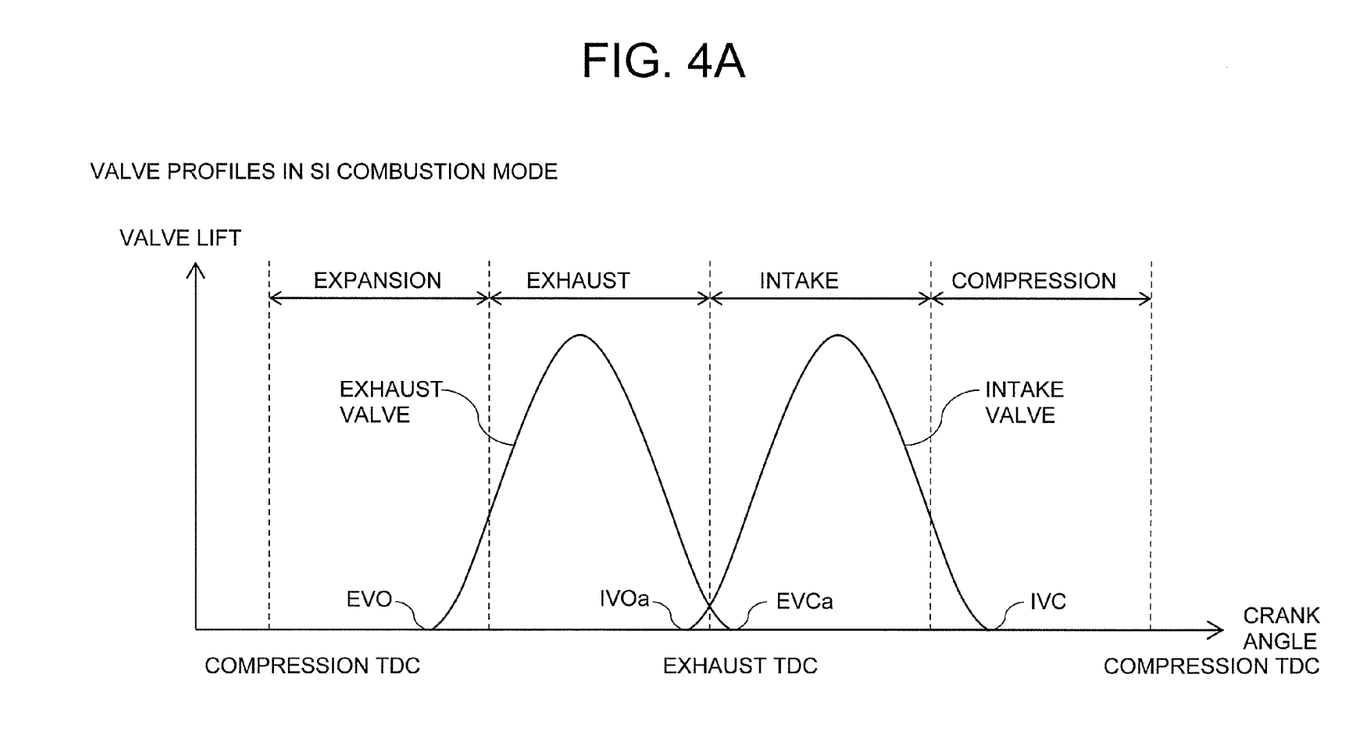
FIGS. 4A and 4B are graphs showing valve operations in the SI combustion mode and the HCCI combustion mode according to the embodiment of the present invention.
Figure 4B:
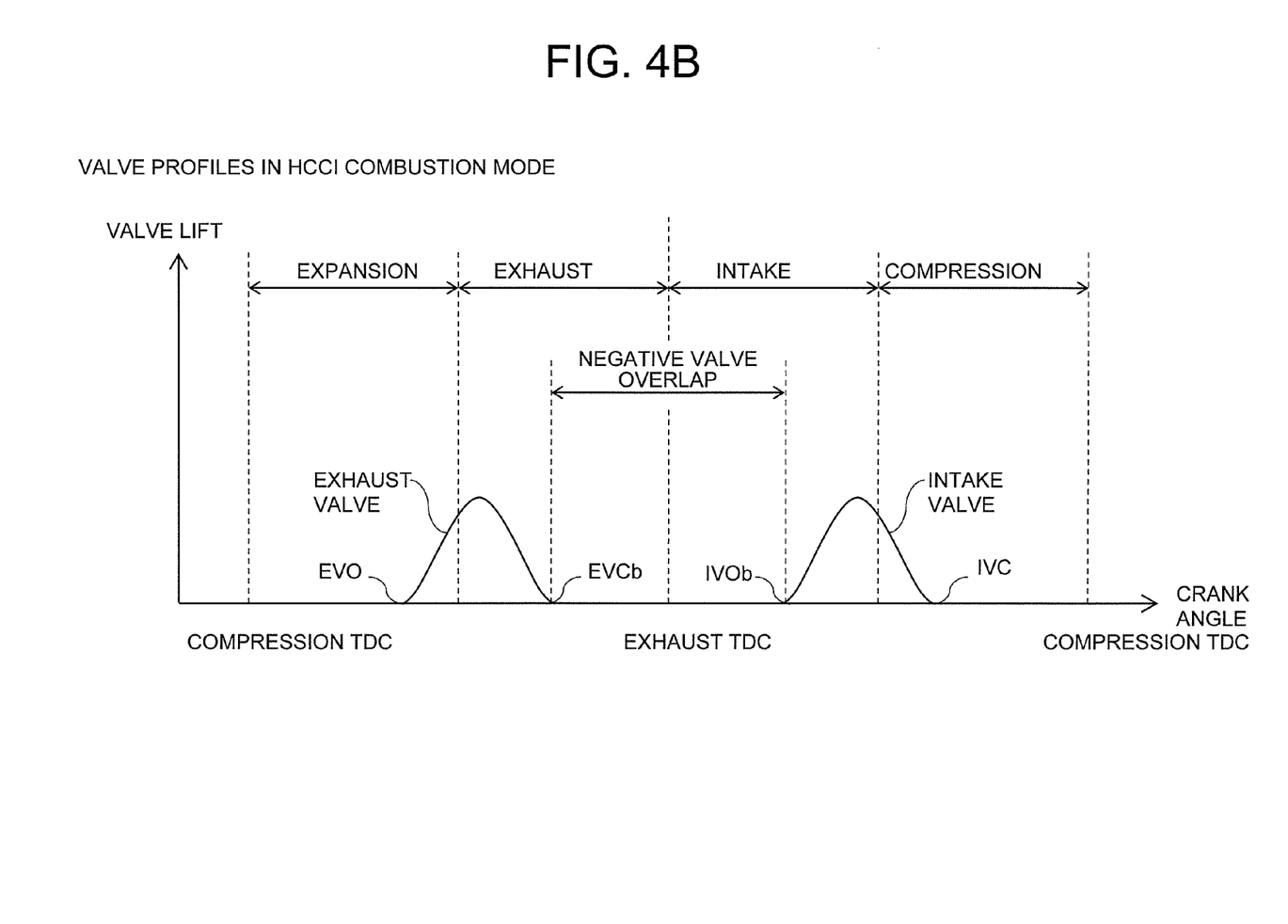

Referring to FIGS. 3 and 4, a description is now given of operation states of the engine 100. FIG. 3 shows an operation area map of the engine 100, and FIGS. 4A and 4B show valve profiles of the intake valve 3 and the exhaust valve 4.

The combustion mode of the engine 100 is switched between the SI combustion mode and the HCCI combustion mode depending on the operation state by control of the ECU 10 (combustion mode switching control part) while referring to the operation area map of FIG. 3. It should be noted that the operation area map is set in advance by experiments and the like.

Moreover, the ECU 10 carries out opening degree control for the throttle valve, control for the ignition timing and the fuel injection amount, and operations described below.

In (a) SI area of FIG. 3, the engine 100 operates in the SI combustion mode in which the mixture is subjected to the flame propagation combustion by being ignited with the spark discharge by using the ignition plug 6. In (a) SI area, as shown in valve profiles during the SI combustion of FIG. 4A, in order to provide the so-called "overlap period" where both the intake valve 3 and the exhaust valve 4 are simultaneously opening, the intake valve 3 opens at IVOa before the exhaust top dead center (hereinafter referred to as exhaust TDC), and the exhaust valve 4 closes at EVCa after the exhaust TDC.

In (b) HCCI area of FIG. 3, the engine 100 operates in the HCCI combustion mode in which the mixture is compressed as the piston 5 moves upward, and is ignited and burnt approximately simultaneously in the entire combustion chamber without use of the ignition plug 6. In (b) HCCI area, as shown in valve profiles during the HCCI combustion of FIG. 4B, in order to provide the so-called "negative overlap period" where both the intake valve 3 and the exhaust valve 4 simultaneously are closed, the exhaust valve 4 is closed at EVCb before the exhaust TDC, and the intake valve 3 is opened at IVOb after the exhaust TDC. A part of the burnt gas generated by the previous cycle can be kept remaining in the combustion chamber 2 as the internal EGR by closing the exhaust valve 4 during the exhaust stroke in this way. As a result, the intake air introduced into the combustion chamber 2 and the internal EGR at a high temperature are mixed, and hence the mixture temperature can be increased at a beginning of the compression (at IVC when the intake valve 3 closes), resulting in the HCCI combustion.

(c) Intermediate area for switching the combustion mode between the SI combustion mode and the HCCI combustion mode is set around (b) HCCI area for the operation in the HCCI combustion mode. In (c) intermediate area, an intermediate combustion mode is carried out. In the intermediate combustion mode, the flame propagation combustion is carried out by moving the open timing of the intake valve 3 from IVOa to IVOb, and moving the close timing of the exhaust valve 4 from EVCa to EVCb, thereby increasing the internal EGR, and igniting the mixture with the spark discharge of the ignition plug 6, and the compression ignition is carried out by increasing the pressure and temperature of the remaining mixture the combustion pressure of the flame propagation.

The intermediate combustion mode is carried out in this way when the combustion mode is switched between the SI combustion mode and the HCCI combustion mode, thereby enabling smooth switching of the combustion modes.

However, as the internal EGR increases, inert gases included in the mixture increase, which makes the flame propagation combustion by the ignition plug 6 difficult, resulting in the combustion fluctuation and the misfire. Therefore, when the internal EGR more than a predetermined amount is carried out, a stable intermediate combustion mode cannot be realized due to an increase in the combustion fluctuation and the misfire, resulting in such a problem that the combustion mode cannot be switched between the SI combustion mode and the HCCI combustion mode.

Moreover, as the internal EGR increases, the combustion period extends, and the ignition timing needs to be advanced for optimal thermal efficiency. In this case, as the ignition timing is separated from a compression TOC more, the pressure and temperature of the mixture at the ignition timing decrease. Further, the combustion temperature decreases as the internal EGR increases, and when the ignition timing is advanced as described above, the remaining mixture does not reach a pressure and a temperature for the compression ignition in the flame propagation combustion by the spark plug 6, resulting in such a problem that the combustion mode cannot be switched between the SI combustion mode and the HCCI combustion mode.

Thus, according to the present invention, when the combustion mode is switched between the SI combustion mode and the HCCI combustion mode, based on the absence/presence of the combustion fluctuation and the combustion temperature, the ratio of specific heat of the mixture is increased by reducing the fuel injection amount so that the oxygen density contained in the internal EGR used to form the mixture increases, thereby increasing the pressure and temperature of the mixture in the compression stroke to bring about a state where the mixture is more easily ignited by compression, resulting in smooth switching of the combustion mode.

According to one embodiment of the present invention, there is provided a control apparatus for an internal combustion engine, which is capable of switching a combustion mode between a spark ignition combustion mode for combusting a mixture formed in a combustion chamber with spark ignition and a compression ignition combustion mode for combusting the mixture with compression ignition, the control apparatus including: an ignition timing control part for controlling a timing for igniting the mixture with a spark; a fuel injection amount control part for controlling a fuel injection amount supplied to the combustion chamber; an internal EGR control part for keeping a part of a burnt gas generated by the combustion remaining as an internal EGR in the combustion chamber; and a combustion mode switching control part for switching the combustion mode between the spark ignition combustion mode and the compression ignition combustion mode, in which when the combustion mode switching control part carries out switching from the spark ignition combustion mode to the compression ignition combustion mode, an internal EGR amount of the internal EGR is increased, the ignition timing is advanced, and the fuel injection amount is decreased so that an oxygen density contained in the internal EGR used to form the mixture increases. According to one embodiment of the present invention, there is also provided a control method for an internal combustion engine.

As a result, even when the switching between the SI combustion mode and the HCCI combustion mode is difficult only by adjusting the internal EGR and the ignition timing, the oxygen density contained in the internal EGR is increased by reducing the fuel injection amount, the ratio of specific heat of the mixture is increased by increasing the oxygen density contained in the internal EGR, and the compression ignition of the mixture is enabled by increasing the pressure and the temperature in the compression stroke, and thus the combustion mode can be switched.

Further, the control apparatus for an internal combustion engine further includes a combustion fluctuation determination part for detecting fluctuation of the combustion, and when the combustion fluctuation determination part determines that the combustion fluctuates, the combustion mode switching control part decreases the fuel injection amount so as to increase the oxygen density.

As a result, when it is determined that the combustion fluctuation occurs, even when it is determined that the switching between the SI combustion mode and the HCCI combustion mode is difficult only by adjusting the internal EGR and the ignition timing, the oxygen density contained in the internal EGR is increased by reducing the fuel injection amount, the ratio of specific heat of the mixture is increased by increasing the oxygen density contained in the internal EGR, and the compression ignition of the mixture is enabled by increasing the pressure and the temperature in the compression stroke, and thus the combustion mode can be switched without the combustion fluctuation.

Further, the combustion fluctuation determination part calculates at least one of a fluctuation rate of an engine torque between combustion cycles or a fluctuation rate of a combustion position between combustion cycles as a combustion fluctuation value, and determines that the combustion fluctuates when the combustion fluctuation value is more than a predetermined value.

As a result, the combustion fluctuation caused by defective combustion and defective ignition is precisely detected by using at least one of a fluctuation rate of an engine torque between combustion cycles or a fluctuation rate of a combustion position between combustion cycles as the combustion fluctuation value.

Further, the control apparatus for an internal combustion engine further includes a combustion temperature detection part for detecting a combustion temperature, and when the combustion temperature decreases below a predetermined value, the combustion mode switching control part decreases the fuel injection amount so as to increase the oxygen density contained in the internal EGR used to form the mixture.

As a result, when the combustion temperature decreases below the predetermined value, it is determined that the exhausted amount of NOx is reduced, the oxygen density contained in the internal EGR is increased by reducing the fuel injection amount, the ratio of specific heat of the mixture is increased by increasing the oxygen density contained in the internal EGR, and the compression ignition of the mixture is enabled by increasing the pressure and the temperature in the compression stroke, and thus the combustion mode can be switched without degradation of emission.

Further, the combustion mode switching control part retards the combustion timing when the fuel injection amount is decreased to increase the oxygen density contained in the internal EGR.

As a result, when the ratio of specific heat of the mixture in the next combustion cycle is increased by reducing the fuel injection amount and the state where the mixture is more easily ignited by compression is brought about by increasing the pressure and temperature of the mixture after the compression, the combustion position can be optimized by retarding the ignition timing.

Figure 1:
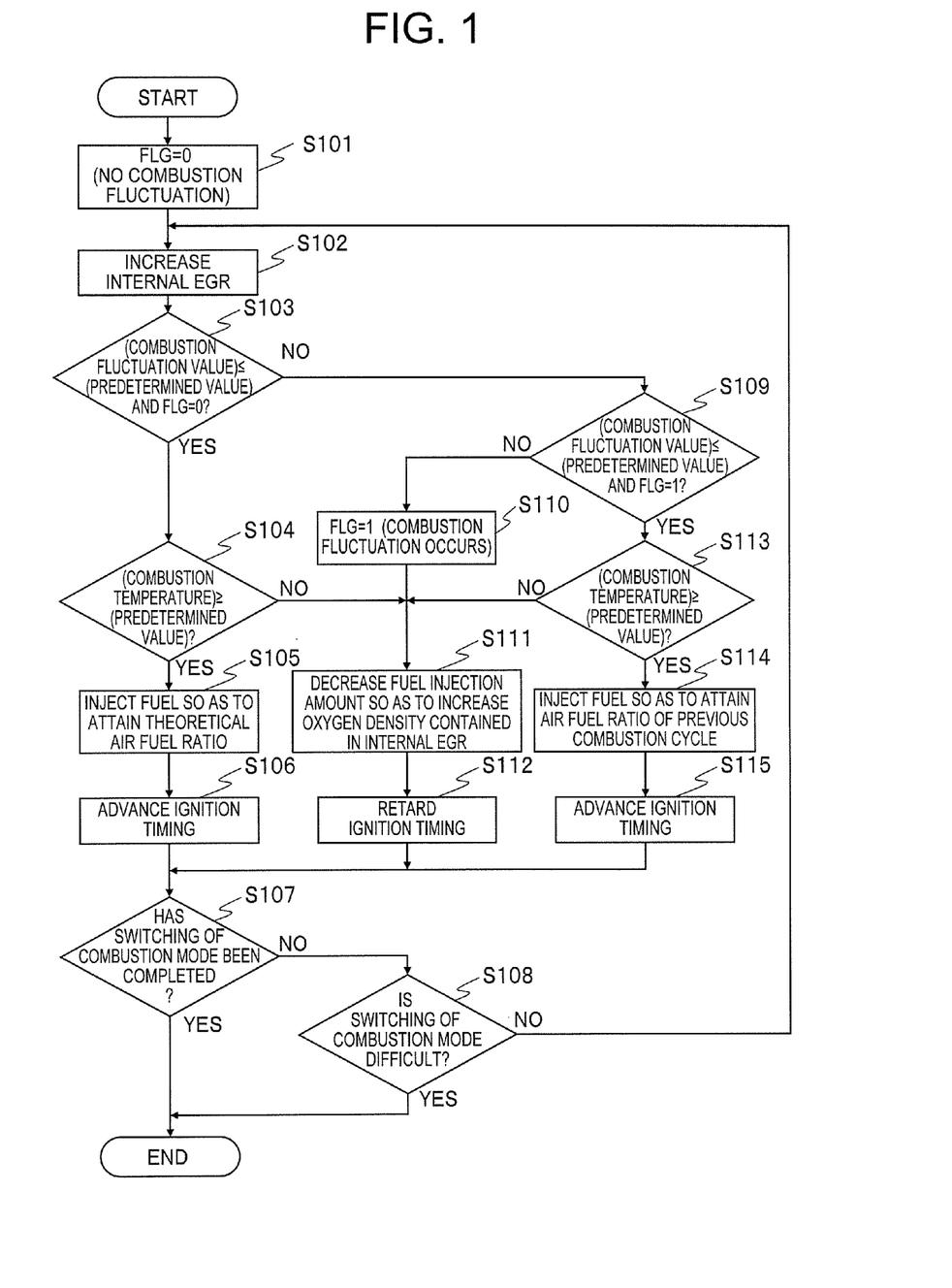
FIG. 1 is a flowchart illustrating a control procedure of combustion mode switching control in a control apparatus for an internal combustion engine according to an embodiment of the present invention.

FIG. 1 is a flowchart illustrating a control procedure of combustion mode switching control carried out by the ECU 10. The control procedure is repeated at a predetermined interval (such as 10[milliseconds]) when it is determined that a current operation area is in (c) intermediate area based on the operation area map of FIG. 3 from an engine torque and an engine rotation (RPM). It should be noted that the engine torque is calculated based on the detection signal from the accelerator position sensor 12. Moreover, the engine rotation is calculated based on the detection signal from the crank angle sensor 13.

In Step S101, the ECU 10 sets a combustion fluctuation determination flag, FLG, which represents whether or not the combustion fluctuation is generated during the combustion mode switching control, to OFF (FLG=0, no combustion fluctuation).

In Step S102, the ECU 10 increases the negative overlap (state where the intake valve 3 and the exhaust valve 4 are simultaneously closed) to increase the internal EGR in the combustion chamber. As a result, the intake air introduced into the combustion chamber 2 and the internal EGR at the high temperature are mixed, and hence the mixture temperature can be increased at a beginning of the compression (IVC when the intake valve 3 closes), resulting in a state close to a mixture state enabling the HCCI combustion.

Subsequently, in Step S103 (combustion fluctuation determination part), the ECU 10 determines whether or not the combustion fluctuation value is equal to or less than the predetermined value, and the combustion fluctuation determination flag, FLG, is OFF (FLG=0). On this occasion, the combustion fluctuation value is at least one of a fluctuation rate of an engine torque between combustion cycles or a fluctuation rate of a combustion position between combustion cycles, and is calculated based on the detection values of the crank angle sensor 13, an in-cylinder pressure sensor for detecting the pressure in the combustion chamber and a knock sensor, which are not shown in FIG. 2, and the like (combustion fluctuation detection part). The combustion fluctuation value can be used to precisely detect the combustion fluctuation caused by defective combustion and defective ignition.

When the combustion fluctuation value is equal to or less than the predetermined value, and the combustion fluctuation determination flag, FLG, is OFF (YES in Step S103), the ECU 10 proceeds to Step S104, and otherwise (NO in Step S103), the ECU 10 proceeds to Step S109. In the following, first, a description is given of a subsequent procedure in the case of YES in Step S103.

In Step S104, the ECU 10 determines whether the combustion temperature is equal to or more than a predetermined value. On this occasion, the combustion temperature is calculated based on a detection value of at least one (combustion temperature detection part) of the in-cylinder pressure sensor which is provided at the cylinder 1, an intake air temperature sensor for detecting the temperature of the intake air, which is provided at the intake passage 8, or an exhaust gas temperature sensor for detecting the temperature of the exhaust gas, which is provided at the exhaust passage 20, these are not shown in FIG. 2. It is generally known that, in Step S102, as the internal EGR is increased, the combustion temperature decreases, and the NOx is restrained from being generated as a result of the decreased combustion temperature (for example, temperature less than 1,750[° C.]).

When the combustion temperature is equal to or more than the predetermined value (YES in Step S104), the ECU 10 proceeds to Step S105, and otherwise (NO in Step S104), the ECU 10 proceeds to Step S111. In the following, first, a description is given of a subsequent procedure in the case of YES in Step S104.

In Step S105, the fuel injection amount is adjusted so that the air fuel ratio detected by the air fuel ratio sensor 21 is approximately the theoretical air fuel ratio in order to restrain a discharged amount of NOx with the purification action by the three-way catalyst 22. Specifically, in Step S102, the throttle valve 9a is opened depending on an increased amount in the internal EGR so as to maintain the constant intake air amount introduced into the combustion chamber 2, resulting in a reduction in the pumping loss. Therefore, when the fuel injection amount remains to be constant, the engine torque increases, and when the engine torque needs to be constant, the fuel injection amount is reduced while maintaining the theoretical air fuel ratio.

Subsequently, in Step S106 (ignition timing control part), the ignition timing is advanced so as to optimize the combustion position depending on the increase amount in the internal EGR in Step S102.

A description is now given of a subsequent procedure in the case of NO in Step S103, namely, a case where the combustion fluctuation value is more than the predetermined value or a case where the combustion fluctuation determination flag, FLG, is ON (FLG=1).

In Step S109 (combustion fluctuation determination part), the ECU 10 determines whether or not the combustion fluctuation value is equal to or less than the predetermined value, and the combustion fluctuation determination flag, FLG, is ON (FLG=1). When the combustion fluctuation value is equal to or less than the predetermined value, and the combustion fluctuation determination flag, FLG, is ON (YES in Step S109), the ECU 10 proceeds to Step S113, and otherwise (NO in Step S109), the ECU 10 proceeds to Step S110. In the following, first, a description is given of a subsequent procedure in the case of NO in Step S109.

In the case of NO in Step 109, namely, when the combustion fluctuation value is more than the predetermined value, in Step S110, the ECU 10 sets the combustion fluctuation determination flag, FLG, to ON (FLG=1), and determines that a combustion fluctuation occurs during the combustion mode switching control.

Subsequently, in Step S111, the ECU 10 decreases the fuel injection amount so as to increase the oxygen density contained in the internal EGR. As a result, the ratio of specific heat of the mixture increases in the next combustion cycle.

On this occasion, when it is assumed that the mixture undergoes an adiabatic change in the compression stroke, the pressure P, the volume V, and the temperature T of the mixture are represented by using the ratio of specific heat K as Equations (1) and (2) below.

$$P_{CA1}V_{CA1}{}^{\kappa}=P_{CA2}V_{CA2}{}^{\kappa}=\text{const (constant)} \quad (1)$$

$$T_{CA1}V_{CA1}{}^{\kappa-1}=T_{CA2}V_{CA2}{}^{\kappa-1}=\text{const (constant)} \quad (2)$$

where:
P: pressure of mixture
V: volume of mixture
T: temperature of mixture
κ: ratio of specific heat of mixture
CA1: before compression
CA2: after compression
Equations (1)' and (2)' below are derived from Equations (1) and (2).

$$P_{CA2} = P_{CA1} \times (V_{CA1}/V_{CA2})^\kappa \text{ [because } V_{CA1}/V_{CA2} > 1 \text{]} \quad (1)'$$

$$T_{CA2} = T_{CA1} \times (V_{CA1}/V_{CA2})^{\kappa-1} \text{ [because } V_{CA1}/V_{CA2} > 1 \text{]} \quad (2)'$$

It is appreciated that, from Equations (1)' and (2)', the pressure $P_{CA2}$ and the temperature $T_{CA2}$ of the mixture after the compression increase as the ratio of specific heat κ of the mixture increases. In other words, the ratio of specific heat κ of the mixture in the next combustion cycle can be increased by decreasing the fuel injection amount in Step S111 to increase the pressure $P_{CA2}$ and the temperature $T_{CA2}$ of the mixture after the compression, thereby bringing about the state where the mixture is more easily ignited by compression, resulting in the smooth switching of the combustion mode. It is conceivable to increase the intake air introduced into the combustion chamber 2 as means for increasing the ratio of specific heat κ, but the increase in the intake air decreases the temperature $T_{CA1}$ of the mixture before the compression, and the decrease in the intake air is inappropriate for the switching to the HCCI combustion mode.

Moreover, the thermal efficiency $\eta_{th}$ of the engine is represented as Equation (3) below.

$$\eta_{th} = 1 - 1/\epsilon^{\kappa-1} \quad (3)$$

where:
$\eta_{th}$: thermal efficiency of engine ε: compression ratio of engine

It is appreciated from Equation (3) that the thermal efficiency $\eta_{th}$ of the engine increases as the ratio of specific heat κ increases. In other words, even when the fuel injection amount is decreased in Step S111, the combustion mode can be switched without a decrease in the engine torque in the state where the operation is normal in the intermediate combustion mode.

Subsequently, in Step S112 (ignition timing control part), the ignition timing is retarded so as to optimize the combustion position depending on the decrease in the fuel injection amount in Step S111.

A description is now given of a subsequent procedure in the case of YES in Step S109, namely, a case where the combustion fluctuation value is equal to or less than the predetermined value and the combustion fluctuation determination flag, FLG, is ON (FLG=1). This is such a state that the combustion fluctuates (FLG=1) during the combustion mode switching control, but the combustion fluctuation has settled due to a decrease in the fuel injection amount or the like.

In Step S113, the ECU 10 determines whether the combustion temperature is equal to or more than a predetermined value similarly to Step S104.

When the combustion temperature is equal to or more than the predetermined value (YES in Step S113), the ECU 10 proceeds to Step S114, and otherwise (NO in Step S113), the ECU 10 proceeds to Step S111. In the following, first, a description is given of a subsequent procedure in the case of YES in Step S113.

In Step S114, the fuel injection amount is adjusted so that the air fuel ratio detected by the air fuel ratio sensor 21 is the air fuel ratio in the previous combustion cycle. As a result, when the combustion mode is switched in an operation area where the combustion fluctuation highly possibly occurs, the combustion mode can be switched without generating unnecessary combustion fluctuation caused by a change in the ratio of specific heat of the mixture.

Subsequently, in Step S115 (ignition timing control part), the ignition timing is advanced so as to optimize the combustion position depending on the increase amount in the internal EGR in Step S102 similarly to Step S106.

Then, when the determination result is NO in Step S104 or S113, namely, the combustion temperature is lower than the predetermined value, in Step S111, the ECU 10 decreases the fuel injection amount so as to increase the oxygen density contained in the internal EGR. As described above, when the combustion temperature decreases (for example, decreases below 1,750[° C.]), the NOx is restrained from being generated, and hence the air fuel ratio does not need to be the theoretical air fuel ratio in order to purify NOx by using the three-way catalyst 22. The fuel injection amount can be decreased so as to increase the oxygen density contained in the internal EGR in this combustion state, and hence the combustion mode can be smoothly switched without degradation in the emission.

In Step S107, the ECU 10 determines whether or not the switching of the combustion mode has been completed. In this embodiment, a detailed description is not given of a method of determining whether or not the switching of the combustion mode has been completed, but the determination needs to be made based on combustion parameters such as a combustion speed and the thermal efficiency, absence/presence of a change in the combustion position depending on a change in the ignition timing, and the like. When the ECU 10 determines that the switching of the combustion mode has been completed (YES in Step S107), the ECU 10 finishes the combustion mode switching control, and otherwise (NO in Step S107), the ECU 10 proceeds to Step S108.

In Step S108, the ECU 10 determines whether or not the switching of the combustion mode is difficult. In this embodiment, a detailed description is not given of a method of determining whether or not the switching of the combustion mode is difficult, but it needs to be determined that the switching of the combustion mode is difficult when the combustion fluctuation does not settle in a predetermined period, or when the combustion fluctuation value exceeds a predetermined value. When the ECU 10 determines that the switching of the combustion mode is difficult (YES in Step S108), the ECU 10 finishes the combustion mode switching control, and otherwise (NO in Step S108), the ECU 10 proceeds to Step S102, and repeats the processing.

As described above, the control apparatus for an internal combustion engine according to the embodiment of the present invention reduces the fuel injection amount so as to increase the oxygen density contained in the internal EGR based on the absence/presence of the combustion fluctuation and the combustion temperature when the switching of the combustion modes is carried out through the internal EGR and the spark ignition. As a result, the ratio of specific heat of the mixture in the next combustion cycle is increased to increase the pressure and temperature of the mixture after the compression, thereby bringing about the state where the mixture is easily compressed and ignited, resulting in the smooth switching of the combustion mode without occurrence of the degradation in the emission.

The ECU 10 includes functions regarding an ignition timing control part, a fuel injection amount control part, an internal EGR control part, a combustion mode switching control part, and a combustion fluctuation determination part.

What is claimed is:

1. A control apparatus for an internal combustion engine, which is capable of switching a combustion mode between a spark ignition combustion mode for combusting a mixture formed in a combustion chamber with spark ignition and a compression ignition combustion mode for combusting the mixture with compression ignition, the control apparatus comprising:
    an ignition timing control part for controlling a timing for igniting the mixture with a spark;
    a fuel injection amount control part for controlling a fuel injection amount supplied to the combustion chamber;
    an internal EGR control part for keeping a part of a burnt gas generated by the combustion remaining as an internal EGR in the combustion chamber; and
    a combustion mode switching control part for switching the combustion mode between the spark ignition combustion mode and the compression ignition combustion mode,
    wherein, when the combustion mode switching control part carries out switching from the spark ignition combustion mode to the compression ignition combustion mode, the control apparatus is configured to: increase an internal EGR amount of the internal EGR; advance the ignition timing; and to decrease the fuel injection amount so that an oxygen density contained in the internal EGR used to form the mixture increases.

2. The control apparatus for an internal combustion engine according to claim 1, further comprising a combustion fluctuation determination part for detecting fluctuation of the combustion,
    wherein, when the combustion fluctuation determination part determines that the combustion fluctuates, the combustion mode switching control part decreases the fuel injection amount so as to increase the oxygen density.

3. The control apparatus for an internal combustion engine according to claim 2, wherein the combustion fluctuation determination part calculates at least one of a fluctuation rate of an engine torque between combustion cycles or a fluctuation rate of a combustion position between combustion cycles as a combustion fluctuation value, and determines that the combustion fluctuates when the combustion fluctuation value is more than a predetermined value.

4. The control apparatus for an internal combustion engine according to claim 1, further comprising a combustion temperature detection part for detecting a combustion temperature,
    wherein when the combustion temperature decreases below a predetermined value, the combustion mode switching control part decreases the fuel injection amount so as to increase the oxygen density contained in the internal EGR used to form the mixture.

5. The control apparatus for an internal combustion engine according to claim 2, further comprising a combustion temperature detection part for detecting a combustion temperature,
    wherein when the combustion temperature decreases below a predetermined value, the combustion mode switching control part decreases the fuel injection amount so as to increase the oxygen density contained in the internal EGR used to form the mixture.

6. The control apparatus for an internal combustion engine according to claim 3, further comprising a combustion temperature detection part for detecting a combustion temperature,
    wherein when the combustion temperature decreases below a predetermined value, the combustion mode switching control part decreases the fuel injection amount so as to increase the oxygen density contained in the internal EGR used to form the mixture.

7. The control apparatus for an internal combustion engine according to claim 1, wherein the combustion mode switching control part retards the combustion timing when the fuel injection amount is decreased to increase the oxygen density contained in the internal EGR.

8. The control apparatus for an internal combustion engine according to claim 2, wherein the combustion mode switching control part retards the combustion timing when the fuel injection amount is decreased to increase the oxygen density contained in the internal EGR.

9. The control apparatus for an internal combustion engine according to claim 3, wherein the combustion mode switching control part retards the combustion timing when the fuel injection amount is decreased to increase the oxygen density contained in the internal EGR.

10. The control apparatus for an internal combustion engine according to claim 4, wherein the combustion mode switching control part retards the combustion timing when the fuel injection amount is decreased to increase the oxygen density contained in the internal EGR.

11. The control apparatus for an internal combustion engine according to claim 5, wherein the combustion mode switching control part retards the combustion timing when the fuel injection amount is decreased to increase the oxygen density contained in the internal EGR.

12. The control apparatus for an internal combustion engine according to claim 6, wherein the combustion mode switching control part retards the combustion timing when the fuel injection amount is decreased to increase the oxygen density contained in the internal EGR.

13. A control method for an internal combustion engine, which is to be carried out in a control apparatus for an internal combustion engine, the control apparatus being capable of switching a combustion mode between a spark ignition combustion mode for combusting a mixture formed in a combustion chamber with spark ignition and a compression ignition combustion mode for combusting the mixture with compression ignition, the method comprising:
    when the combustion mode is switched from the spark ignition combustion mode to the compression ignition combustion mode, in an internal EGR control for keeping a part of a burnt gas generated by the combustion remaining as an internal EGR in the combustion chamber, increasing an internal EGR amount of the internal EGR; advancing an ignition timing; and decreasing a fuel injection amount so that an oxygen density contained in the internal EGR used to form the mixture increases.

* * * * *